United States Patent
Ling et al.

(10) Patent No.: US 11,249,246 B2
(45) Date of Patent: Feb. 15, 2022

(54) MULTIPLE STAGE BRAGG GRATINGS IN MULTIPLEXING APPLICATIONS

(71) Applicant: Cisco Technology, Inc., San Jose, CA (US)

(72) Inventors: Tao Ling, Breinigsville, PA (US); Yi Ho Lee, Breinigsville, PA (US); Ravi S. Tummidi, Breinigsville, PA (US); Mark A. Webster, Bethlehem, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/107,298

(22) Filed: Nov. 30, 2020

(65) Prior Publication Data

US 2021/0109281 A1 Apr. 15, 2021

Related U.S. Application Data

(63) Continuation of application No. 16/445,083, filed on Jun. 18, 2019, now Pat. No. 10,852,472.

(51) Int. Cl.
 *G02B 6/02* (2006.01)
 *G02B 6/12* (2006.01)
 (Continued)

(52) U.S. Cl.
 CPC ..... *G02B 6/02076* (2013.01); *G02B 6/12007* (2013.01); *G02B 6/29383* (2013.01);
 (Continued)

(58) Field of Classification Search
 None
 See application file for complete search history.

(56) References Cited

U.S. PATENT DOCUMENTS

| 5,608,825 A | 3/1997 | Ip |
| 5,657,406 A | 8/1997 | Ball |

(Continued)

FOREIGN PATENT DOCUMENTS

CN 105700071 A 6/2016

OTHER PUBLICATIONS

C. Wu et al., "Strong $\hbox{LP}_{01}$ and $\hbox{LP}_{11}$ Mutual Coupling Conversion in a Two-Mode Fiber Bragg Grating," in IEEE Photonics Journal, vol. 4, No. 4, pp. 1080-1086, Aug. 2012, doi: 10.1109/JPHOT.2012.2204735. (Year: 2012).*

(Continued)

*Primary Examiner* — Darren E Wolf
(74) *Attorney, Agent, or Firm* — Patterson + Sherdan, LLP (57) ABSTRACT

Aspects described herein include an optical apparatus comprising a multiple-stage arrangement of two-mode Bragg gratings comprising: at least a first Bragg grating of a first stage. The first Bragg grating is configured to transmit a first two wavelengths and to reflect a second two wavelengths of a received optical signal. The optical apparatus further comprises a second Bragg grating of a second stage. The second Bragg grating is configured to transmit one of the first two wavelengths and to reflect an other of the first two wavelengths. The optical apparatus further comprises a third Bragg grating of the second stage. The third Bragg grating is configured to transmit one of the second two wavelengths and to reflect an other of the second two wavelengths.

20 Claims, 9 Drawing Sheets

(51) Int. Cl.
| | |
|---|---|
| *G02B 6/293* | (2006.01) |
| *H04J 14/02* | (2006.01) |
| *H04B 10/50* | (2013.01) |
| *H04B 10/60* | (2013.01) |
| *H04B 10/66* | (2013.01) |
| *H04B 10/67* | (2013.01) |
| *H04J 14/00* | (2006.01) |
| *H04B 10/40* | (2013.01) |

(52) U.S. Cl.
CPC .............. *H04J 14/0278* (2013.01); *G02B 2006/12126* (2013.01); *H04B 10/40* (2013.01); *H04B 10/50* (2013.01); *H04B 10/60* (2013.01); *H04B 10/66* (2013.01); *H04B 10/67* (2013.01); *H04B 10/671* (2013.01); *H04B 10/672* (2013.01); *H04J 14/00* (2013.01); *H04J 14/02* (2013.01)

(56) References Cited

U.S. PATENT DOCUMENTS

| | | | |
|---|---|---|---|
| 5,748,350 | A | 5/1998 | Pan et al. |
| 5,757,487 | A | 5/1998 | Kersey |
| 6,201,907 | B1 | 3/2001 | Farries |
| 6,263,126 | B1 | 7/2001 | Cao |
| 6,404,948 | B2 | 6/2002 | Alexander et al. |
| 6,516,112 | B1 | 2/2003 | Jang et al. |
| 6,559,988 | B1 | 5/2003 | Nielsen et al. |
| 6,594,410 | B2 | 7/2003 | Kersey et al. |
| 8,532,446 | B2 | 9/2013 | Zheng et al. |
| 9,553,689 | B2 | 1/2017 | Kato |
| 9,829,640 | B2 | 11/2017 | Kato |
| 9,967,049 | B2 | 5/2018 | Zheng et al. |
| 10,317,621 | B2 | 6/2019 | Mahgerefteh |
| 10,852,472 | B1 | 12/2020 | Ling et al. |
| 2003/0108283 | A1 | 6/2003 | Ota et al. |
| 2004/0028332 | A1 | 2/2004 | Nishiki |
| 2004/0037503 | A1 | 2/2004 | Hastings et al. |
| 2004/0109235 | A1 | 6/2004 | Zhong et al. |
| 2004/0234262 | A1 | 11/2004 | Bortz |
| 2004/0264963 | A1 | 12/2004 | Kani et al. |
| 2005/0220406 | A1 | 10/2005 | Jones et al. |
| 2006/0140541 | A1 | 6/2006 | Gorni et al. |
| 2012/0315044 | A1 | 12/2012 | McGreer et al. |
| 2017/0082801 | A1 | 3/2017 | Welch et al. |
| 2020/0233378 | A1 | 7/2020 | Mian et al. |

OTHER PUBLICATIONS

Huiye Qiu, Jianfei Jiang, Ping Yu, Tingge Dai, Jianyi Yang, Hui Yu, and Xiaoqing Jiang, "Silicon band-rejection and band-pass filter based on asymmetric Bragg sidewall gratings in a multimode waveguide," Opt. Lett. 41, 2450-2453 (2016) [Abstract Only].

Castro, Jose M., et al. "Optical add-drop multiplexers based on the antisymmetric waveguide Bragg grating." Applied Optics 45.6 (2006): 1236-1243.

Khurgin, Jacob B., et al. "Add-drop filters based on mode-conversion cavities." Optics letters 32.10 (2007): 1253-1255.

PCT Notification of Transmittal of the International Search Report and the Written Opinion of the International Searching Authority, or the Declaration for Application No. PCT/US2020/037861 dated Oct. 7, 2020.

Horst, Folkert & Green, William & Assefa, Solomon & Shank, Steven & Vlasov, Yurii & Offrein, B.J.. (2013). Cascaded Mach-Zehnder wavelength filters in silicon photonics for low loss and flat pass-band WDM (de-) multiplexing. Optics express. 21. 11652-8. 10.1364/OE.21.011652. [Abstract Only].

Shi, Wei & Yun, Han & Lin, Charlie & Wang, Xu & Flueckiger, Jonas & Jaeger, Nicolas & Chrostowski, Lukas. (2013). Silicon CWDM Demultiplexers Using Contra-Directional Couplers. 2013 Conference on Lasers and Electro-Optics, CLEO 2013. 10.1364/CLEO_SI.2013.CTu3F.5. [Abstract Only].

Painchaud, "Bragg grating notch filters in silicon-on-insulator waveguides", 2012, OSA, Advanced Photonics Congress (Year: 2012).

Madsen, C.K., et al. "Planar waveguide add/drop filter employing a mode-converting grating in an adiabatic coupler." Integrated Photonics Research .. Optical Society of America, 1998. [Abstract Only].

Puckett, "Multichannel Bragg gratings in silicon waveguides with asymmetric sidewall modulation," 2015, OSA, vol. 40, No. 3, Optical Letters, pp. 379-382 (Year 2015).

Pan, "Dense WDM multiplexer and demultiplexer with 0.4nm channel spacing", 1998, Electronic Letters, vol. 34, No. 1, pp. 74-75 (Year 1998).

Wang, "Multi-period bragg gratings in silicon waveguides", 2013, IEEE, WD2.5, 978-1-4577-1507-5/13, pp. 442-443 (Year 2013).

\* cited by examiner

MULTIPLE STAGE BRAGG GRATINGS IN MULTIPLEXING APPLICATIONS

CROSS-REFERENCE TO RELATED APPLICATIONS

This application is a continuation of co-pending U.S. patent application Ser. No. 16/445,083, filed Jun. 18, 2019. The aforementioned related patent application is herein incorporated by reference in its entirety.

TECHNICAL FIELD

Embodiments presented in this disclosure generally relate to optical multiplexing, and more specifically, to wavelength division multiplexing (WDM) using multiple stages of Bragg gratings.

BACKGROUND

WDM schemes support multiple channels through a light-carrying medium, such as an optical waveguide or an optical fiber. WDM schemes are typically distinguished by the spacing between wavelengths. For example, a "normal" WDM system supports 2 channels spaced apart by 240 nanometers (nm), a coarse WDM (CWDM) system supports up to eighteen (18) channels that are spaced apart by 20 nm, and a dense WDM (DWDM) system supports up to eighty (80) channels that are spaced apart by 0.4 nm. Due to the wavelength spacing, a CWDM system tends to be more tolerant than a DWDM system and does not require high-precision laser sources. As a result, a CWDM system tends to be less expensive and consumes less power.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

In one embodiment, an optical apparatus comprises a multiple-stage arrangement of two-mode Bragg gratings comprising: at least a first Bragg grating of a first stage. The first Bragg grating is configured to transmit a first two wavelengths and to reflect a second two wavelengths of a received optical signal. The optical apparatus further comprises a second Bragg grating of a second stage. The second Bragg grating is configured to transmit one of the first two wavelengths and to reflect an other of the first two wavelengths. The optical apparatus further comprises a third Bragg grating of the second stage. The third Bragg grating is configured to transmit one of the second two wavelengths and to reflect an other of the second two wavelengths.

In another embodiment, an optical apparatus comprises a plurality of transmitters and a multiplexer having a multiple-stage arrangement of two-mode Bragg gratings comprising: a first Bragg grating having a first input port coupled with a first transmitter of the plurality of transmitters, a first add port coupled with a second transmitter of the plurality of transmitters, and a first output port configured to output a first optical signal comprising a first two wavelengths. The multiplexer further comprises a second Bragg grating having a second input port coupled with a third transmitter of the plurality of transmitters, a second add port coupled with a fourth transmitter of the plurality of transmitters, and a second output port configured to output a second optical signal comprising a second two wavelengths. The multiplexer further comprises a third Bragg grating having a third input port configured to receive the first two wavelengths, a third add port configured to receive the second two wavelengths, and a third output port configured to output a third optical signal comprising the first two wavelengths and the second two wavelengths.

In another embodiment, an optical apparatus comprises a plurality of receivers and a demultiplexer having a multiple-stage arrangement of two-mode Bragg gratings comprising a first Bragg grating having a first input port configured to receive an optical signal, a first drop port configured to transmit a first wavelength and a second wavelength of the optical signal, and a first output port configured to transmit a third wavelength and a fourth wavelength of the optical signal. The demultiplexer further comprises a second Bragg grating having a second input port configured to receive the first wavelength and the second wavelength, a second drop port configured to transmit the first wavelength to a first receiver of the plurality of receivers, and a second output port configured to transmit the second wavelength to a second receiver of the plurality of receivers. The demultiplexer further comprises a third Bragg grating having a third input port coupled with the first output port, a third drop port configured to transmit the third wavelength to a third receiver of the plurality of receivers, and a third output port configured to transmit the fourth wavelength to a fourth receiver of the plurality of receivers.

Example Embodiments

To achieve a WDM-based optical transceiver module with a small size, optical multiplexing and demultiplexing (mux/demux) functionality may be implemented in (or integrated with) a photonic integrated circuit (IC) of the optical transceiver module. Low optical losses with the optical mux/demux are preferable to support a lower-power optical communication system. Further, optical mux/demux having flat-top passbands are beneficial to eliminate the temperature control of the laser and will reduce the total power consumption of the optical communication system.

According to embodiments described herein, a multiplexer and/or demultiplexer comprises a plurality of Bragg gratings arranged in a plurality of stages. Using a WDM demultiplexer as an example, a first Bragg grating of a first stage is used to transmit a first two wavelengths and to reflect a second two wavelengths of a multiplexed optical signal. A second Bragg grating of a second stage transmits one of the first two wavelengths to a first receiver, and reflects the other of the first two wavelengths to a second receiver. A third Bragg grating of the second stage transmits one of the second two wavelengths to a third receiver, and reflects the other of the second two wavelengths to a fourth receiver. In some embodiments, the plurality of Bragg gratings is formed in optical waveguides of a silicon photonic chip. In some embodiments, the first Bragg grating comprises different sidewall corrugation periods, where each sidewall grating reflects a respective wavelength.

Beneficially, using the multiple stages of Bragg gratings provides the multiplexer and/or the demultiplexer with a relatively flat-top passband, and may be used to eliminate the temperature control on the laser source and/or to reduce the power consumption of the optical apparatus. Further, the Bragg gratings may be capable of achieving very low insertion loss, such that the multiplexer and/or the demultiplexer has a low insertion loss, e.g., less than 1 decibel (dB). Further, using the multiple stages of Bragg gratings allows the Bragg gratings of the second stage to have much wider passbands and greater fabrication tolerance.

Figure 1:
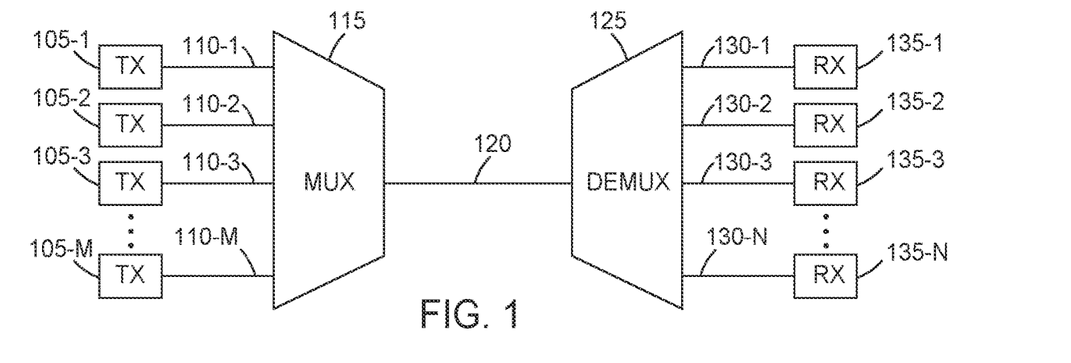
FIG. 1 is a diagram of an exemplary optical apparatus, according to one or more embodiments.

FIG. 1 is a diagram 100 of an exemplary optical apparatus, according to one or more embodiments. In some embodiments, the optical apparatus represents an optical transceiver module integrated into a silicon photonic chip. Other implementations of the optical apparatus are also contemplated.

The optical apparatus comprises a plurality of transmitters 105-1, 105-2, 105-3, ..., 105-M (generically, a transmitter 105) that provide optical signals via a respective plurality of optical links 110-1, 110-2, 110-3, ..., 110-M (generically, an optical link 110) to a multiplexer 115. In some embodiments, each transmitter 105 comprises a laser source generating a respective optical signal (e.g., an unmodulated continuous wave (CW) optical signal) having a respective wavelength. The wavelengths of the optical signals may be selected according to a predefined multiplexing scheme, such as WDM, DWDM, or CWDM. Each transmitter 105 may further comprise an optical modulator configured to modulate the respective optical signal, and may further comprise circuitry for further processing of the respective optical signal. In some embodiments, the optical links 110 are optical waveguides formed in a silicon photonic chip. In other embodiments, the optical links 110 are optical fibers.

The multiplexer 115 combines the several optical signals into a multiplexed optical signal that is output onto an optical link 120. In some embodiments, the multiplexer 115 comprises a CWDM multiplexer, although implementations using other WDM schemes are also contemplated. In some embodiments, the optical link 120 is an optical waveguide formed in the silicon photonic chip. In other embodiments, the optical link 120 is an optical fiber.

A demultiplexer 125 is communicatively coupled with the multiplexer 115 via the optical link 120. The demultiplexer 125 demultiplexes the multiplexed optical signal transmitted by the optical link 120 into a plurality of optical signals. In some embodiments, the demultiplexer 125 comprises a CWDM demultiplexer, although other implementations are also contemplated. The plurality of optical signals are provided from the demultiplexer 125 via a respective plurality of optical links 130-1, 130-2, 130-3, ..., 130-N (generically, an optical link 130) to a plurality of receivers 135-1, 135-2, 135-3, ..., 135-N (generically, a receiver 135). In some embodiments, the optical links 130 are optical waveguides formed in the silicon photonic chip. In other embodiments, the optical links 130 are optical fibers. In some embodiments, each receiver 135 comprises an optical demodulator to demodulate the respective optical signal, and may further comprise circuitry for further processing of the respective optical signal.

In some embodiments, and as will be discussed in greater detail, the multiplexer 115 and/or the demultiplexer 125 comprises respective Bragg gratings that are arranged in multiple stages. In some embodiments, the multiplexer 115 and/or the demultiplexer 125 comprises a multiple-stage arrangement of two-mode Bragg gratings. Beneficially, using the multiple stages of Bragg gratings provides the multiplexer 115 and/or the demultiplexer 125 with a relatively flat-top passband, and may be used to eliminate the temperature control on the laser source of the transmitters 105 and/or to reduce the power consumption of the optical apparatus. Further, Bragg gratings may be capable of achieving very low insertion loss, such that the multiplexer 115 and/or the demultiplexer 125 has an insertion loss of less than 1 dB.

Figure 2:
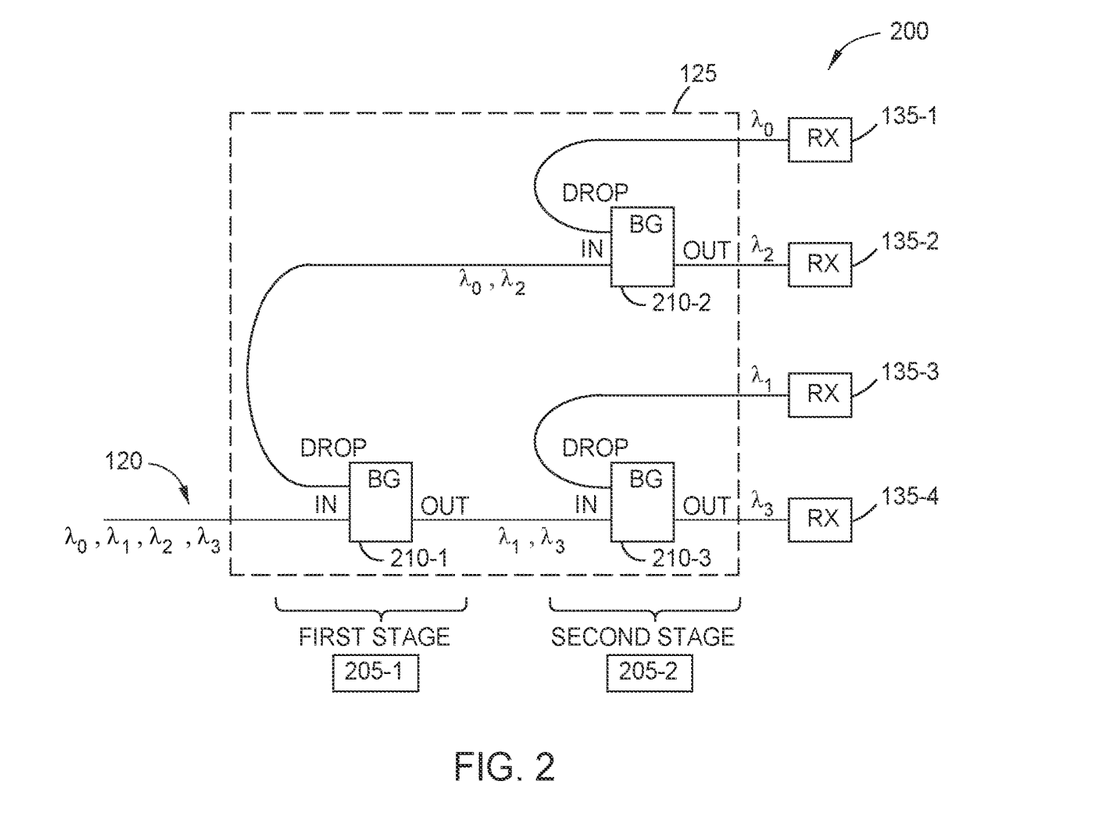
FIG. 2 is a diagram of an exemplary demultiplexer with multiple stage Bragg gratings, according to one or more embodiments.

FIG. 2 is a diagram 200 of an exemplary demultiplexer 125 with multiple stage Bragg gratings, according to one or more embodiments. In the diagram 200, the demultiplexer 125 is communicatively coupled with four (4) receivers 135-1, 135-2, 135-3, 135-4 via respective optical links. Each of the receivers 135-1, 135-2, 135-3, 135-4 may comprise an optical demodulator and/or circuitry for further processing of the received optical signal having a respective wavelength. As shown, the receiver 135-1 receives a first optical signal having a wavelength $\lambda_0$, the receiver 135-2 receives a second optical signal having a wavelength $\lambda_2$, the receiver 135-3 receives a third optical signal having a wavelength $\lambda_1$, and the receiver 135-4 receives a fourth optical signal having a wavelength $\lambda_3$.

The demultiplexer 125 comprises a first Bragg grating 210-1, which comprises an input port IN, a drop port DROP, and an output port OUT. The input port IN is coupled with the optical link 120. The drop port DROP is coupled with a second Bragg grating 210-2, and the output port OUT is coupled with a third Bragg grating 210-3.

The demultiplexer 125 further comprises a second Bragg grating 210-2, which comprises an input port IN, an add port ADD, and an output port OUT. The input port IN is directly coupled with the drop port DROP of the first Bragg grating 210-1. The drop port DROP is coupled with the receiver 135-1, and the output port OUT is coupled with the receiver 135-2.

The demultiplexer 125 further comprises a third Bragg grating 210-3, which comprises an input port IN, an add port ADD, and an output port OUT. The input port IN is directly coupled with the output port OUT of the first Bragg grating 210-1. The drop port DROP is coupled with the receiver 135-3, and the output port OUT is coupled with the receiver 135-4. In some embodiments, each of the first Bragg grating 210-1, the second Bragg grating 210-2, and the third Bragg grating 210-3 comprises a two-mode Bragg grating, such that demultiplexer 125 comprises a multiple-stage arrangement of two-mode Bragg gratings. Beneficially, using two-mode Bragg gratings provides the demultiplexer 125 with relatively flat-top passbands, and may reduce the overall power consumption of the optical apparatus. Further, the two-mode Bragg gratings may be capable of achieving very low insertion loss, such that the demultiplexer 125 has an insertion loss of less than 1-2 dB. In some embodiments, the two-mode Bragg gratings transmit a first mode (e.g., a fundamental transverse electric (TE) mode) of received light and reflects a second mode (e.g., a first-order and/or second-order TE mode) of the light. In some embodiments, the demultiplexer 125 may further comprise mode multiplexers that convert the mode of the reflected wavelength (e.g., a first-order TE mode) into a fundamental TE mode.

The first Bragg grating 210-1 is included in a first stage 205-1, in which the four wavelengths $\lambda_0, \lambda_1, \lambda_2, \lambda_3$ carried on a single optical signal over the optical link 120 are demultiplexed onto two optical signals: a first optical signal comprising a first two wavelengths $\lambda_0, \lambda_2$, and a second optical signal comprising a second two wavelengths $\lambda_1, \lambda_3$. The first optical signal is output from the drop port DROP of the first Bragg grating 210-1, and the second optical signal is output from the output port OUT of the first Bragg grating 210-1. The second Bragg grating 210-2 and the third Bragg grating 210-3 are included in a second stage 205-2, in which the first two wavelengths $\lambda_0, \lambda_2$ are demultiplexed into individual wavelengths, and the second two wavelengths $\lambda_1, \lambda_3$ are demultiplexed into individual wavelengths.

In some embodiments, the first two wavelengths $\lambda_0, \lambda_2$ correspond to a first two passbands that are non-overlapping with each other, and the second two wavelengths $\lambda_1, \lambda_3$ correspond to a second two passbands that are non-overlapping with each other. Beneficially, using wavelengths that have non-overlapping passbands for the first stage Bragg gratings (here, the first Bragg grating 210-1) improves the SNR at each wavelength that is output from the first stage Bragg grating.

In some embodiments, one of the second two passbands occurs between the first two passbands. For example, according to a CWDM scheme, the first two passbands may be respectively centered at 1271 nm and 1311 nm, and the second two passbands may be respectively centered at 1291 nm (occurring between the first two passbands) and 1331 nm.

The input port IN of the second Bragg grating 210-2 receives the wavelengths $\lambda_0, \lambda_2$. As shown, the input port IN is directly coupled with the drop port DROP of the first Bragg grating 210-1. The second Bragg grating 210-2 demultiplexes the wavelengths $\lambda_0, \lambda_2$ into a first optical signal having the wavelength $\lambda_0$, and a second optical signal having the wavelength $\lambda_2$.

The drop port DROP of the second Bragg grating 210-2 is coupled with the receiver 135-1, and the first optical signal having the wavelength $\lambda_0$ is provided from the drop port DROP to the receiver 135-1. The output port OUT of the second Bragg grating 210-2 is coupled with the receiver 135-2, and the second optical signal having the wavelength $\lambda_2$ is provided from the output port OUT to the receiver 135-2.

The input port IN of the third Bragg grating 210-3 receives the wavelengths $\lambda_1, \lambda_3$. As shown, the input port IN is directly coupled with the output port OUT of the first Bragg grating 210-1. The third Bragg grating 210-3 demultiplexes the wavelengths $\lambda_1, \lambda_3$ into a third optical signal having the wavelength $\lambda_1$, and a fourth optical signal having the wavelength $\lambda_3$.

The drop port DROP of the third Bragg grating 210-3 is coupled with the receiver 135-3, and the third optical signal having the wavelength $\lambda_1$ is provided from the drop port DROP to the receiver 135-3. The output port OUT of the third Bragg grating 210-3 is coupled with the receiver 135-4, and the fourth optical signal having the wavelength $\lambda_3$ is provided from the output port OUT to the receiver 135-4.

The first Bragg grating 210-1, the second Bragg grating 210-2, and the third Bragg grating 210-3 may have any suitable implementation. In some embodiments, the first Bragg grating 210-1, the second Bragg grating 210-2, and the third Bragg grating 210-3 are formed in a waveguide layer comprising a semiconductor material. In some embodiments, the first Bragg grating 210-1, the second Bragg grating 210-2, and the third Bragg grating 210-3 comprises asymmetric sidewall gratings.

While the demultiplexer 125 has been described as a 4-to-1 (4:1) demultiplexer having two stages 205-1, 205-2 of Bragg gratings, other configurations of the demultiplexer 125 are also contemplated. For example, the demultiplexer 125 may include a larger or smaller number of Bragg gratings, a larger or smaller number of stages, and so forth.

Figure 3:
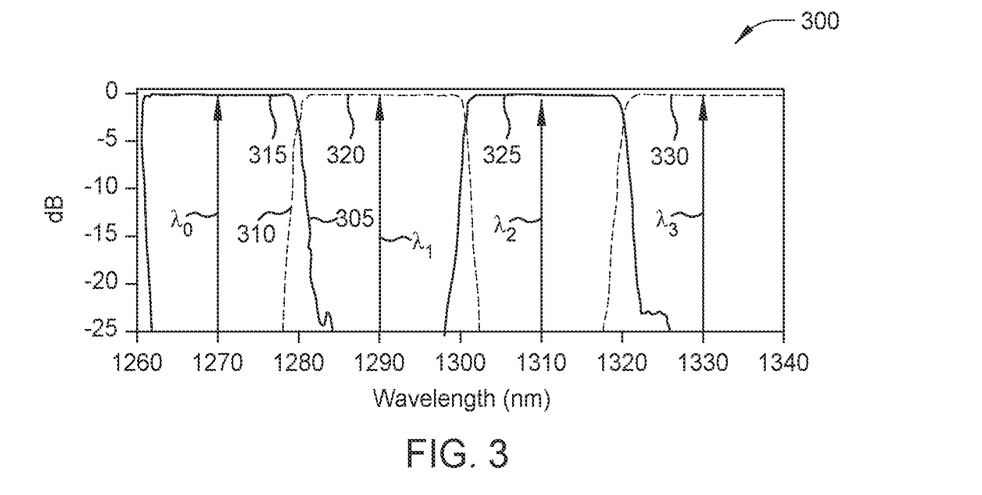
FIG. 3 is a graph illustrating operation of exemplary Bragg gratings, according to one or more embodiments.

FIG. 3 is a graph 300 illustrating operation of exemplary Bragg gratings, according to one or more embodiments. The features of the graph 300 may be used in conjunction with other embodiments, for example, representing the output spectrum of the first Bragg grating 210-1 of FIG. 2.

In the graph 300, a plot 305 represents the first optical signal output from the drop port DROP of the first Bragg grating 210-1, and the plot 310 represents the second optical signal output from the output port OUT of the first Bragg grating 210-1. The first optical signal comprises a first passband 315 centered at a first wavelength $\lambda_0$ (here, 1271 nm), and a second passband 325 centered at a second wavelength $\lambda_2$ (here, 1311 nm). The second optical signal comprises a third passband 320 centered at a third wavelength $\lambda_1$ (here, 1291 nm), and a fourth passband 330 centered at a fourth wavelength $\lambda_3$ (here, 1331 nm).

As shown, the first two wavelengths $\lambda_0, \lambda_2$ correspond to a first two passbands 315, 325 that are non-overlapping with each other, and the second two wavelengths Ai, $\lambda_3$ correspond to a second two passbands 320, 330 that are non-overlapping with each other. Beneficially, using wavelengths that have non-overlapping passbands for the first stage Bragg gratings (here, the first Bragg grating 210-1) improves the SNR at each wavelength that is output from each first stage Bragg grating. For example, use of the non-overlapping passbands supports a wider passband for the Bragg gratings of the second stage 205-2, which makes the different optical signals at the different wavelengths easier to distinguish, and is more tolerant of fabrication processes.

Further, as shown, one of the second two passbands (here, the passband 320) occurs between the first two passbands 315, 325 (e.g., an alternating arrangement of the passbands 315, 320, 325, 330). However, other implementations of the first Bragg grating 210-1 may have a different arrangement of the passbands 315, 320, 325, 330. For example, the first optical signal and/or the second optical signal may have two overlapping passbands, the passbands 315, 320, 325, 330 may be non-alternating, and so forth.

Figure 4:
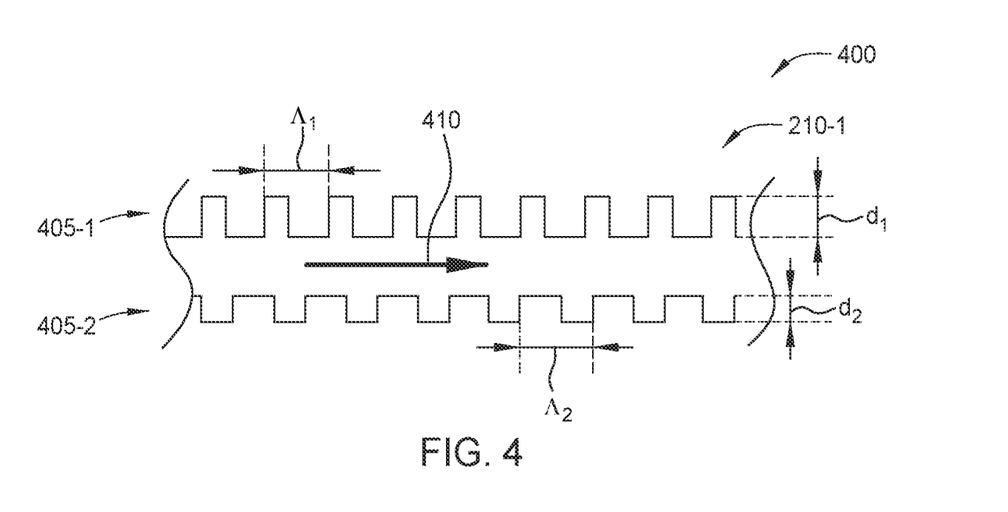
FIG. 4 is a diagram illustrating Bragg gratings with different sidewall corrugation periods, according to one or more embodiments.

FIG. 4 is a diagram 400 illustrating Bragg gratings with different sidewall corrugation periods, according to one or more embodiments. The features of the diagram 400 may be used in conjunction with other embodiments. For example, the sidewall gratings may be used by the first Bragg grating 210-1 of FIG. 2 to pass two wavelengths and reflect two wavelengths of light 410 propagating through an optical waveguide.

In the diagram 400, a first sidewall 405-1 has a first grating pattern with a first corrugation period $\Lambda_1$ and a first depth $d_1$, and a second sidewall 405-2 has a second grating pattern with a second corrugation period $\lambda_2$ and a second depth $d_2$. The first grating pattern and the second grating pattern may be formed, e.g., by deep etching into an edge of an optical waveguide to create the periodic grating patterns along the length of the optical waveguide. In this way, the first sidewall 405-1 is dimensioned to reflect a particular wavelength, and the second sidewall 405-2 is dimensioned to reflect another wavelength. Using FIG. 3 as an example, the first sidewall 405-1 may reflect the first wavelength $\lambda_0$ and the second sidewall 405-2 may reflect the second wavelength $\lambda_2$. In some two-mode implementations of the Bragg gratings, the Bragg grating transmits a first mode (e.g., a fundamental TE mode) of the light 410 and reflects a second mode (e.g., a first-order and/or second-order TE mode) of the light 410.

The grating patterns may have any suitable alternate implementation. For example, one or more grating patterns may be formed using a buried grating layer. Further, in cases where the length of the first Bragg grating 210-1 is sufficiently long (e.g., implemented within an optical fiber), the sidewall gratings may be spaced apart from each other (e.g., at different positions along the length of the first Bragg grating). In some embodiments, the first Bragg grating 210-1 comprises more than two sidewall gratings to reflect more than two wavelengths.

Figure 5:
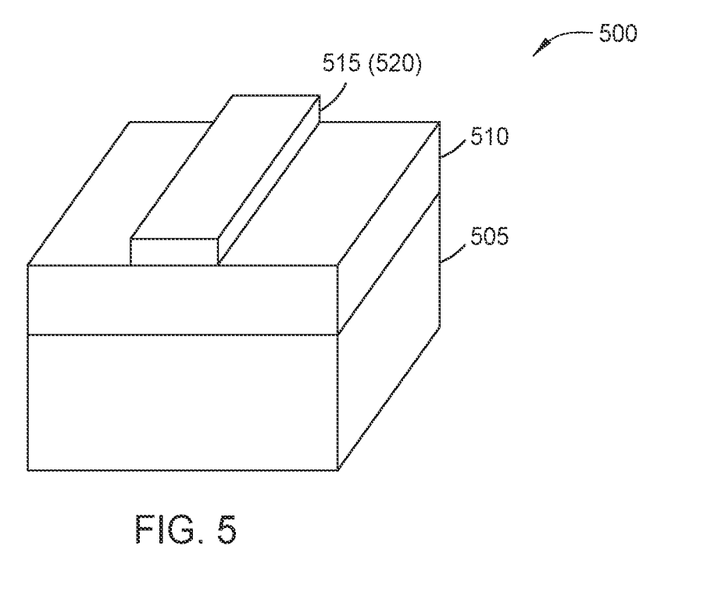
FIGS. 5 and 6 are diagrams of exemplary silicon-on-insulator (SOI) based optical waveguides, according to one or more embodiments.
Figure 6:
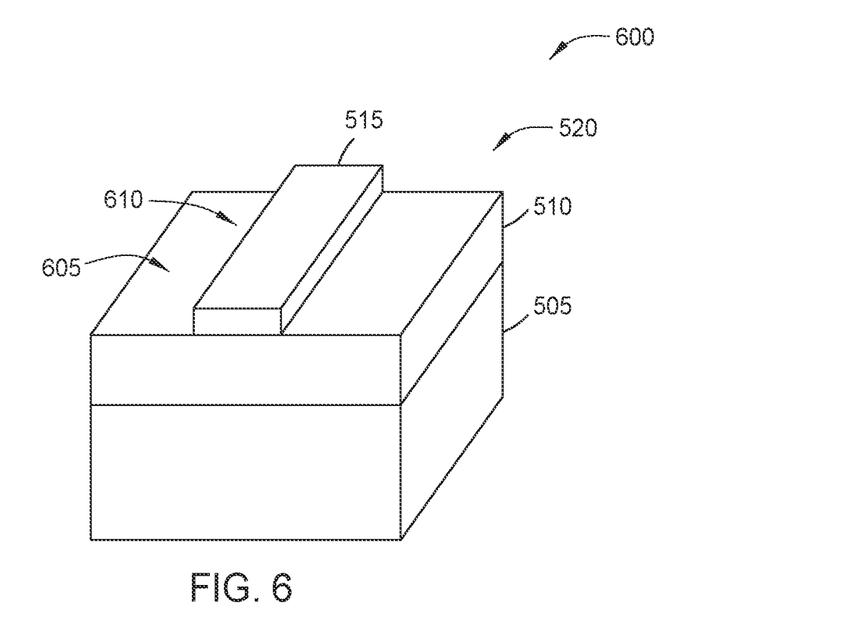

FIGS. 5 and 6 are diagrams 500, 600 of exemplary silicon-on-insulator (SOI) based optical waveguides, according to one or more embodiments. The features of the diagrams 500, 600 may be used in conjunction with other embodiments. For example, the multiplexer 115 and/or demultiplexer 125 of FIG. 1 may be implemented in a silicon photonic chip using the SOI structures illustrated in the diagrams 500, 600.

In some embodiments, a silicon substrate 505 comprises a bulk silicon (Si) substrate in which one or more features or materials for active optical device(s) to be produced (e.g., a laser, detector, modulator, absorber) are pre-processed. The thickness of the silicon substrate 505 may vary depending on the specific application. For example, the silicon substrate 505 may be the thickness of a typical semiconductor wafer (e.g., 100-700 microns), or may be thinned and mounted on another substrate.

The diagrams 500, 600 each depict the silicon substrate 505, an insulator layer 510 disposed above the silicon substrate 505, and an optical waveguide 515 formed in a waveguide layer 520 disposed above the insulator layer 510. In some embodiments, the insulator layer 510 comprises a buried oxide (BOX) layer formed of silicon dioxide. The thickness of the insulator layer 510 may vary depending on the desired application. In some embodiments, the thickness of the insulator layer 510 may range from less than one micron to tens of microns. The thickness of the waveguide layer may range from less than 100 nm to greater than a micron. More specifically, the waveguide layer may be between 100-300 nm thick.

In the diagram 600, the optical waveguide 515 is formed as a ridge waveguide comprising a ridge 610 projecting from a base 605. The ridge waveguide generally confines a propagating optical signal within a portion of the waveguide layer 520. In some embodiments, the waveguide layer 520 has a thickness between 3-5 microns. In some embodiments, the width of the ridge 610 (as shown, in the left-right direction) is between 3-5 microns. With such dimensioning, the diameter of the optical mode may be 4-5 microns.

As discussed above, grating patterns may be etched along the sidewalls of the optical waveguide 515 to form the Bragg gratings of the multiplexer 115 and/or demultiplexer 125.

Figure 7:
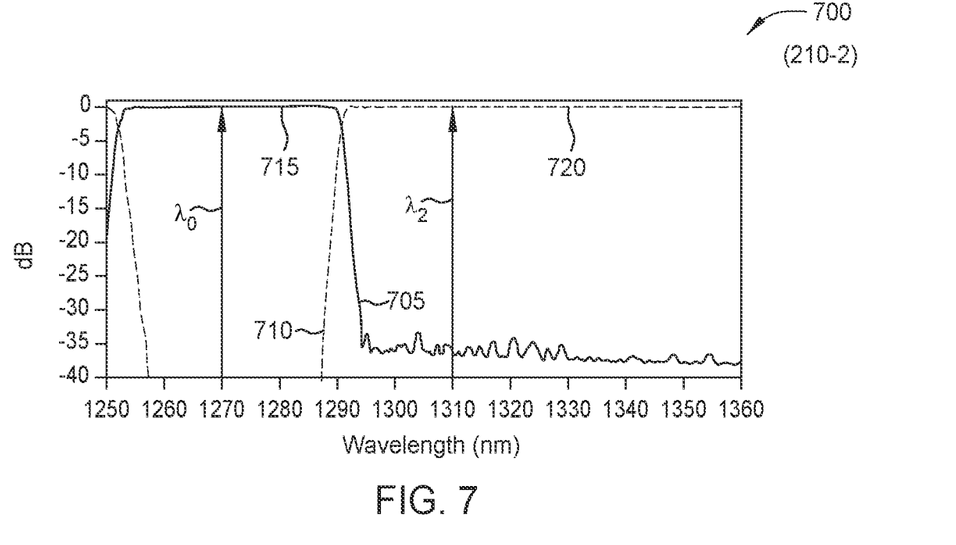
FIGS. 7 and 8 are graphs illustrating operation of exemplary Bragg gratings, according to one or more embodiments.
Figure 8:
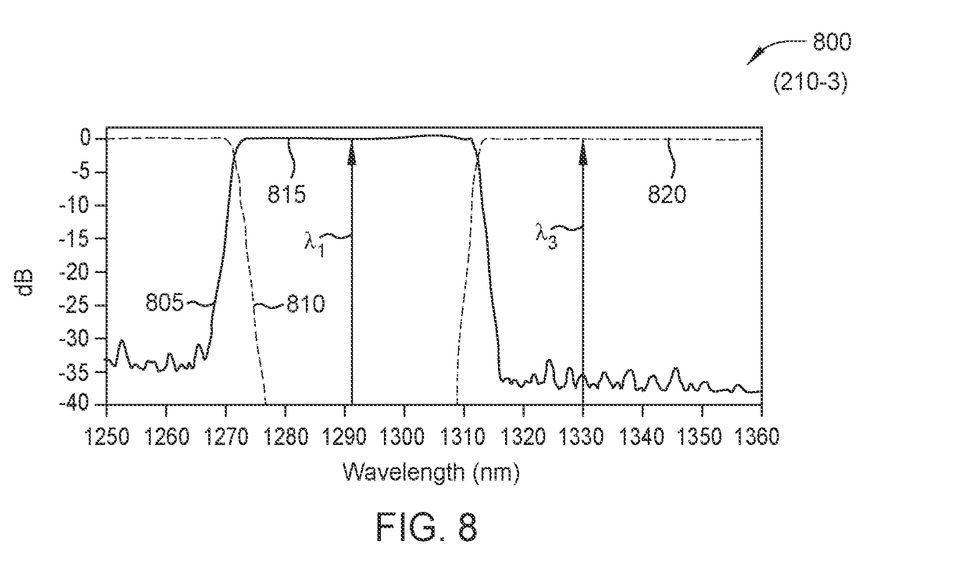

FIGS. 7 and 8 are graphs 700, 800 illustrating operation of exemplary Bragg gratings, according to one or more embodiments. The features of the graphs 700, 800 may be used in conjunction with other embodiments. For example, the graph 700 represents the output spectrum of the second Bragg grating 210-2 of FIG. 2, and the graph 800 represents the output spectrum of the third Bragg grating 210-3.

In the graph 700, a plot 705 represents the first optical signal output from the drop port DROP of the second Bragg grating 210-2, and the plot 710 represents the second optical signal output from the output port OUT of the second Bragg grating 210-2. The first optical signal comprises a first passband 715 centered at a first wavelength $\lambda_0$ (here, 1271 nm), and a second passband 720 that includes a second wavelength $\lambda_2$ (here, 1311 nm).

In the graph 800, a plot 805 represents the first optical signal output from the drop port DROP of the third Bragg grating 210-3, and the plot 810 represents the second optical signal output from the output port OUT of the third Bragg grating 210-3. The first optical signal comprises a first passband 815 centered at a third wavelength $\lambda_1$ (here, 1291 nm), and a fourth passband 820 that includes a fourth wavelength $\lambda_3$ (here, 1331 nm).

Figure 9:
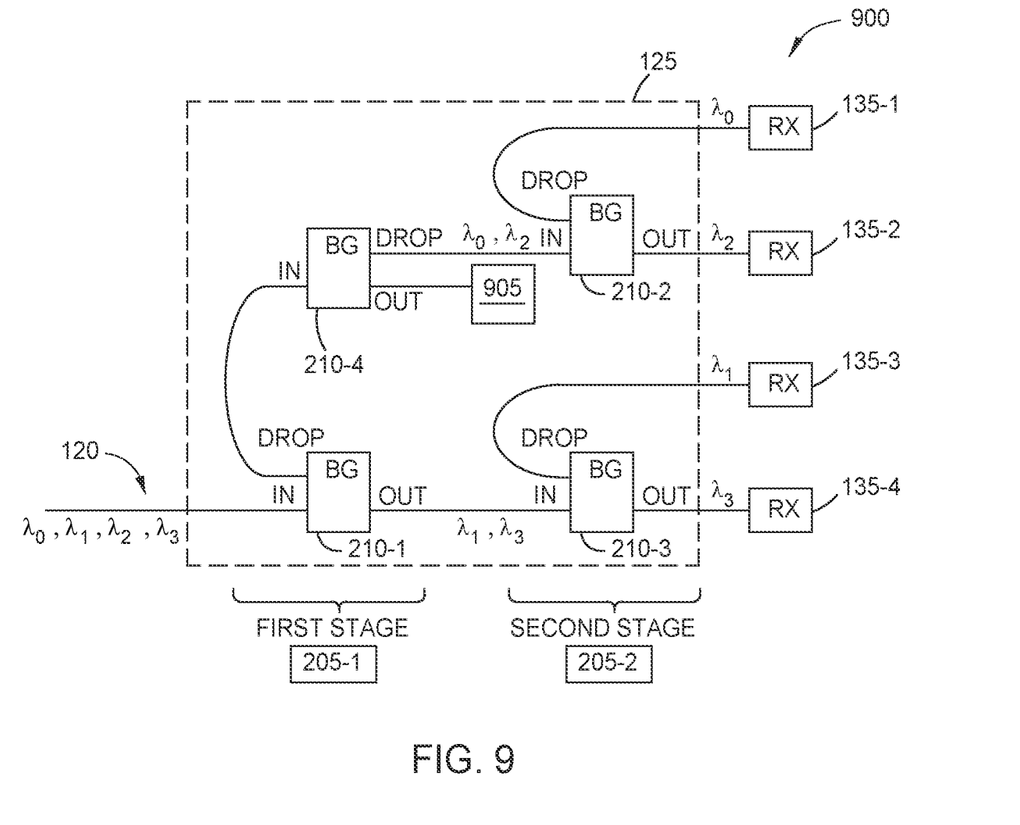
FIG. 9 is a diagram of an exemplary multiplexer with multiple stage Bragg gratings, according to one or more embodiments.

FIG. 9 is a diagram 900 of an exemplary demultiplexer 125 with multiple stage Bragg gratings, according to one or more embodiments. More specifically, the demultiplexer 125 comprises a fourth Bragg grating 210-4 in the first stage 205-1. In some embodiments, the fourth Bragg grating 210-4 comprises a two-mode Bragg grating. The fourth Bragg grating 210-4 comprises an input port IN coupled with the drop port DROP of the first Bragg grating 210-1. The fourth Bragg grating 210-4 further comprises a drop port DROP coupled with the input port IN of the second Bragg grating 210-2.

The input port IN of the fourth Bragg grating 210-4 receives a first optical signal comprising the wavelengths $\lambda_0$, $\lambda_2$. A second optical signal is output from the drop port DROP of the fourth Bragg grating 210-4, the second optical signal comprising the wavelengths $\lambda_0$, $\lambda_2$. Beneficially, including the fourth Bragg grating 210-4 helps to mitigate a crosstalk susceptibility of the demultiplexer 125. The fourth Bragg grating 210-4 further comprises an output port OUT, which in some embodiments is coupled with an optical absorber 905. Beneficially, the optical absorber 905 mitigates reflections of optical signals, which can further improve the SNR of the second optical signal output from the drop port DROP.

Figure 10:
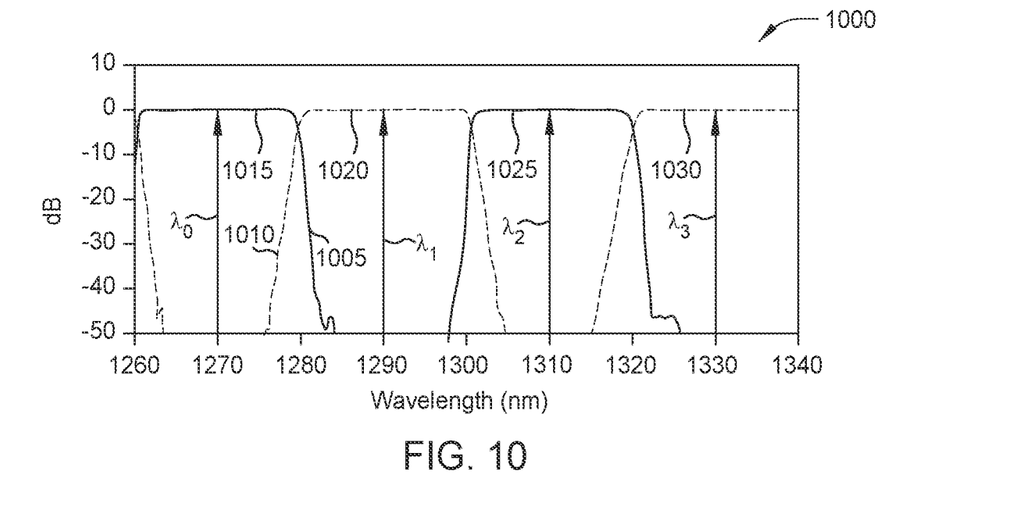
FIG. 10 is a graph illustrating operation of exemplary Bragg gratings, according to one or more embodiments.

FIG. 10 is a graph 1000 illustrating operation of exemplary Bragg gratings, according to one or more embodiments. The features of the graph 1000 may be used in conjunction with other embodiments, for example, representing the output spectrum of the Bragg gratings of the first stage 205-1 (i.e., the first Bragg grating 210-1 and the fourth Bragg grating 210-4) of FIG. 9.

In the graph 1000, a plot 1005 represents a first optical signal output from the drop port DROP of the fourth Bragg grating 210-4, and the plot 1010 represents the second optical signal output from the output port OUT of the first Bragg grating 210-1. The first optical signal comprises a first passband 1015 centered at the first wavelength $\lambda_0$ (here, 1271 nm), and a second passband 1025 centered at the second wavelength $\lambda_2$ (here, 1311 nm). The second optical signal comprises a third passband 1020 centered at the third wavelength $\lambda_1$ (here, 1291 nm), and a fourth passband 1030 centered at the fourth wavelength $\lambda_3$ (here, 1331 nm).

As shown, the output spectrum illustrated by the graph 1000 indicates a mitigated crosstalk susceptibility of the demultiplexer 125. For example, the graph 1000 indicates a susceptibility beyond about −30 dB to −40 dB, compared with a susceptibility beyond about −20 dB to −25 dB as in the graph 300 of FIG. 3.

Figure 11:
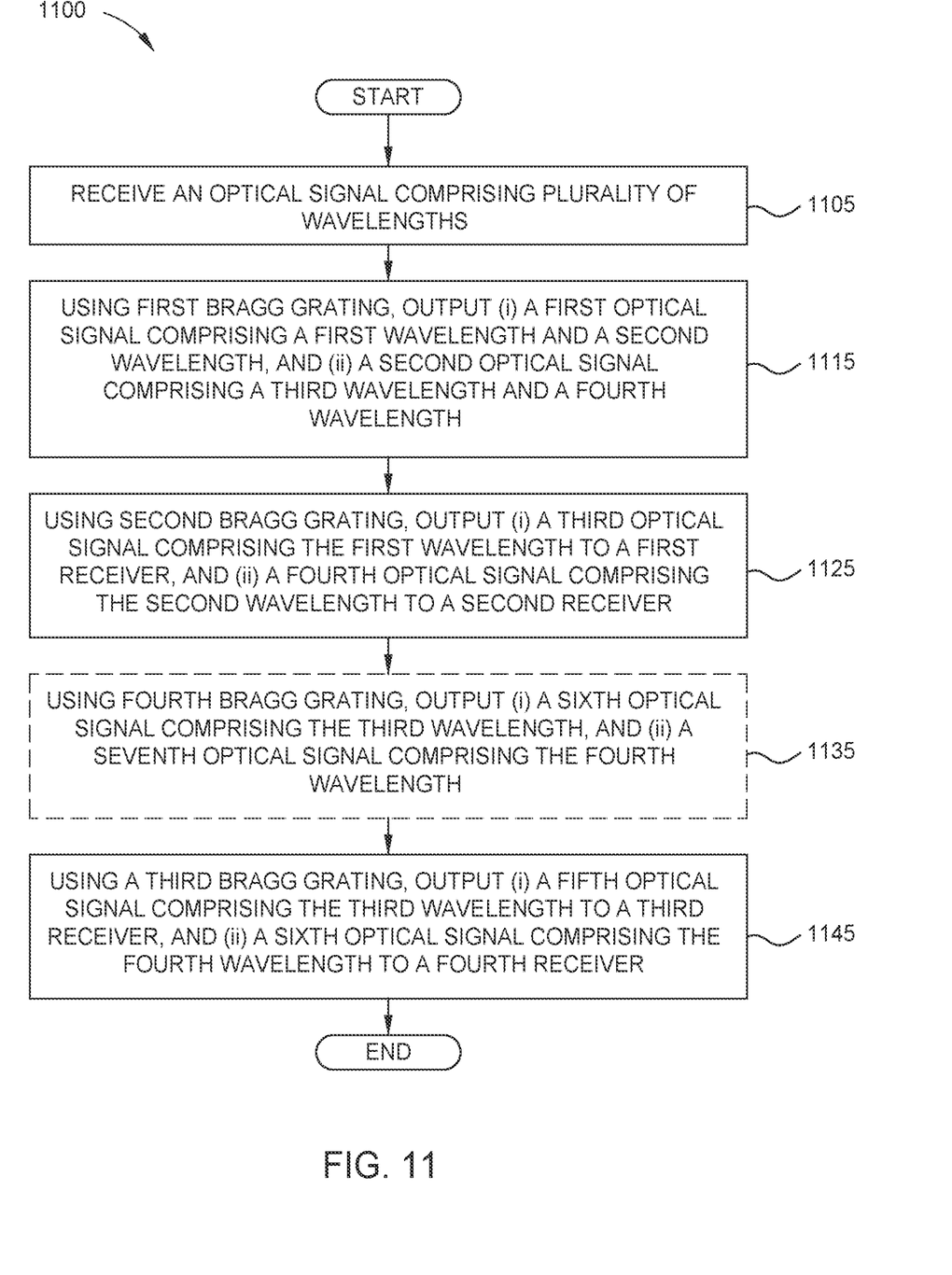
FIG. 11 illustrates a method of demultiplexing using a plurality of Bragg gratings, according to one or more embodiments.

FIG. 11 illustrates a method 1100 of demultiplexing using a plurality of Bragg gratings, according to one or more embodiments. The method 1100 may be performed in conjunction with other embodiments, e.g., using the demultiplexer 125 of FIGS. 1, 2, and 9.

The method 1100 begins at block 1105, where an optical signal is received comprising a plurality of wavelengths. At block 1115, a first Bragg grating (e.g., the first Bragg grating 210-1 of FIGS. 2, 9) is used to output (i) a first optical signal comprising a first wavelength and a second wavelength of the plurality of wavelengths, and (ii) a second optical signal comprising a third wavelength and a fourth wavelength of the plurality of wavelengths.

At block 1125, a second Bragg grating (e.g., the third Bragg grating 210-3 of FIGS. 2, 9) is used to output (i) a third optical signal comprising the first wavelength to a first receiver, and (ii) a fourth optical signal comprising the second wavelength to a second receiver.

At an optional block 1135, a fourth Bragg grating (e.g., the fourth Bragg grating 210-4 of FIGS. 2, 9) is used to output (i) a sixth optical signal comprising the third wavelength, and (ii) a seventh optical signal comprising the fourth wavelength. At block 1145, a third Bragg grating (e.g., the second Bragg grating 210-2 of FIGS. 2, 9) is used to output (i) a fifth optical signal comprising the third wavelength to a third receiver, and (ii) a sixth optical signal comprising the fourth wavelength to a fourth receiver. The method 1100 ends following completion of the block 1145.

Figure 12:
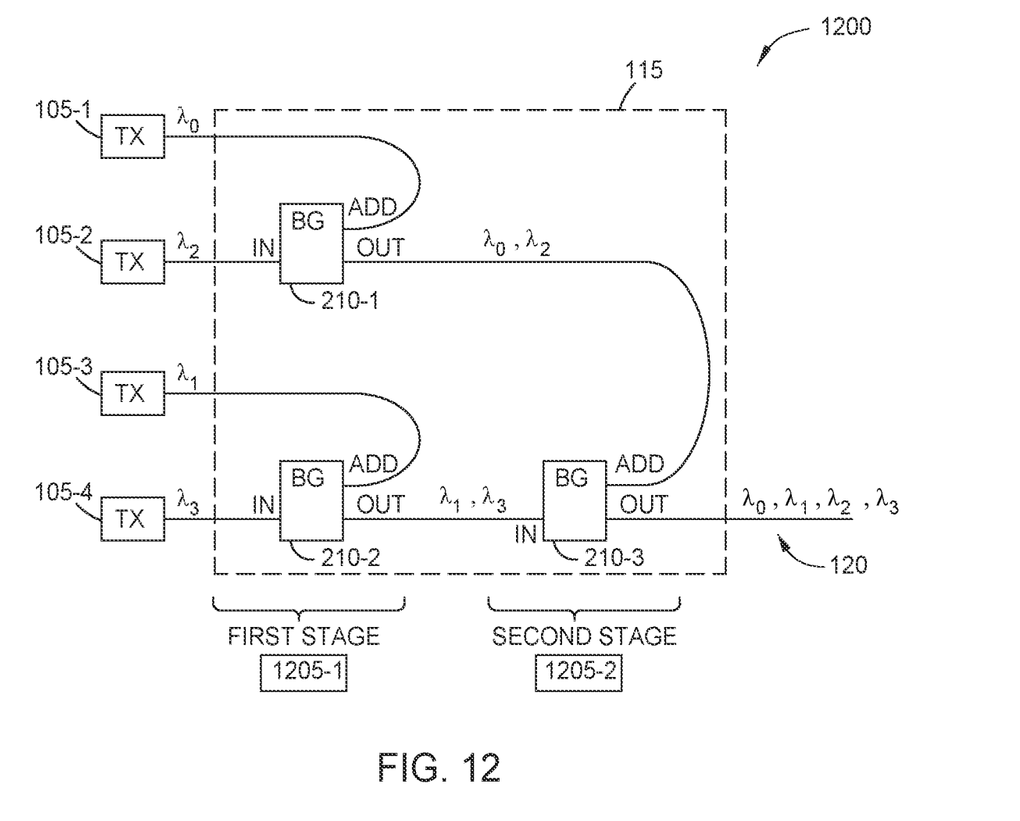
FIGS. 12 and 13 are diagrams of an exemplary multiplexer with multiple stage Bragg gratings, according to one or more embodiments.

FIG. 12 is a diagram 1200 of an exemplary multiplexer 115 with multiple stage Bragg gratings, according to one or more embodiments. The features of the diagram 1200 may be used in conjunction with other embodiments.

In the diagram 1200, the multiplexer 115 is communicatively coupled with four (4) transmitters 105-1, 105-2, 105-3, 105-4 via respective optical links. Each of the transmitters 105-1, 105-2, 105-3, 105-4 may comprise a respective laser source generating a respective optical signal having a respective wavelength, as well as a modulator. As shown, the transmitter 105-1 outputs a first optical signal having a wavelength $\lambda_0$, the transmitter 105-2 outputs a second optical signal having a wavelength $\lambda_2$, the transmitter 105-3 outputs a third optical signal having a wavelength $\lambda_1$, and the transmitter 105-4 outputs a fourth optical signal having a wavelength $\lambda_3$.

The multiplexer 115 comprises a first Bragg grating 210-1, which comprises an input port IN, an add port ADD, and an output port OUT. The input port IN is coupled with the transmitter 105-2, and the add port ADD is coupled with the transmitter 105-1. The output port OUT outputs a first optical signal comprising the wavelengths $\lambda_0$, $\lambda_2$.

The multiplexer 115 further comprises a second Bragg grating 210-2, which comprises an input port IN, an add port ADD, and an output port OUT. The input port IN is coupled with the transmitter 105-4, and the add port ADD is coupled with the transmitter 105-3. The output port OUT outputs a second optical signal comprising wavelengths $\lambda_1$, $\lambda_3$.

The first Bragg grating 210-1 and the second Bragg grating 210-2 are included in a first stage 1205-1, in which the four wavelengths $\lambda_0$, $\lambda_1$, $\lambda_2$, $\lambda_3$ carried on four separate optical signals are multiplexed onto two optical signals: a first optical signal comprising a first two wavelengths $\lambda_0$, $\lambda_2$, and a second optical signal comprising a second two wavelengths $\lambda_1$, $\lambda_3$. In some embodiments, the first two wavelengths $\lambda_0$, $\lambda_2$ correspond to a first two passbands that are non-overlapping with each other, and the second two wavelengths $\lambda_1$, $\lambda_3$ correspond to a second two passbands that are non-overlapping with each other. Beneficially, using wavelengths that have non-overlapping passbands for the first stage Bragg gratings (i.e., the first Bragg grating 210-1 and the second Bragg grating 210-2) improves the SNR at each wavelength that is output from each first stage Bragg grating.

In some embodiments, one of the second two passbands occurs between the first two passbands. For example, according to a CWDM scheme, the first two passbands may be respectively centered at 1271 nm and 1311 nm, and the second two passbands may be respectively centered at 1291 nm (occurring between the first two passbands) and 1331 nm.

The multiplexer 115 further comprises a third Bragg grating 210-3, which comprises an input port IN, an add port ADD, and an output port OUT. The input port IN receives the wavelengths $\lambda_1$, $\lambda_3$. As shown, the input port IN is directly coupled with the output port OUT of the second Bragg grating 210-2. The add port ADD receives the wavelengths $\lambda_0$, $\lambda_2$. As shown, the add port ADD is directly coupled with the output port OUT of the first Bragg grating 210-1.

The output port OUT of the third Bragg grating 210-3 outputs a third optical signal comprising the wavelengths $\lambda_0$, $\lambda_1$, $\lambda_2$, $\lambda_3$ onto the optical link 120. Thus, the third Bragg grating 210-3 is included in a second stage 1205-2, in which the four wavelengths $\lambda_0$, $\lambda_1$, $\lambda_2$, $\lambda_3$ carried on two separate optical signals are multiplexed onto a single optical signal that is output onto the optical link 120.

The first Bragg grating 210-1, the second Bragg grating 210-2, and the third Bragg grating 210-3 may have any suitable implementation. In some embodiments, the first Bragg grating 210-1, the second Bragg grating 210-2, and the third Bragg grating 210-3 are formed in a waveguide layer comprising a semiconductor material. In some embodiments, the first Bragg grating 210-1, the second Bragg grating 210-2, and the third Bragg grating 210-3 comprises asymmetric sidewall gratings.

While the multiplexer 115 has been described as a 4-to-1 (4:1) multiplexer having two stages 1205-1, 1205-2 of Bragg gratings, other configurations of the multiplexer 115 are also contemplated. For example, the multiplexer 115 may include a larger or smaller number of Bragg gratings, a larger or smaller number of stages, and so forth.

Figure 13:
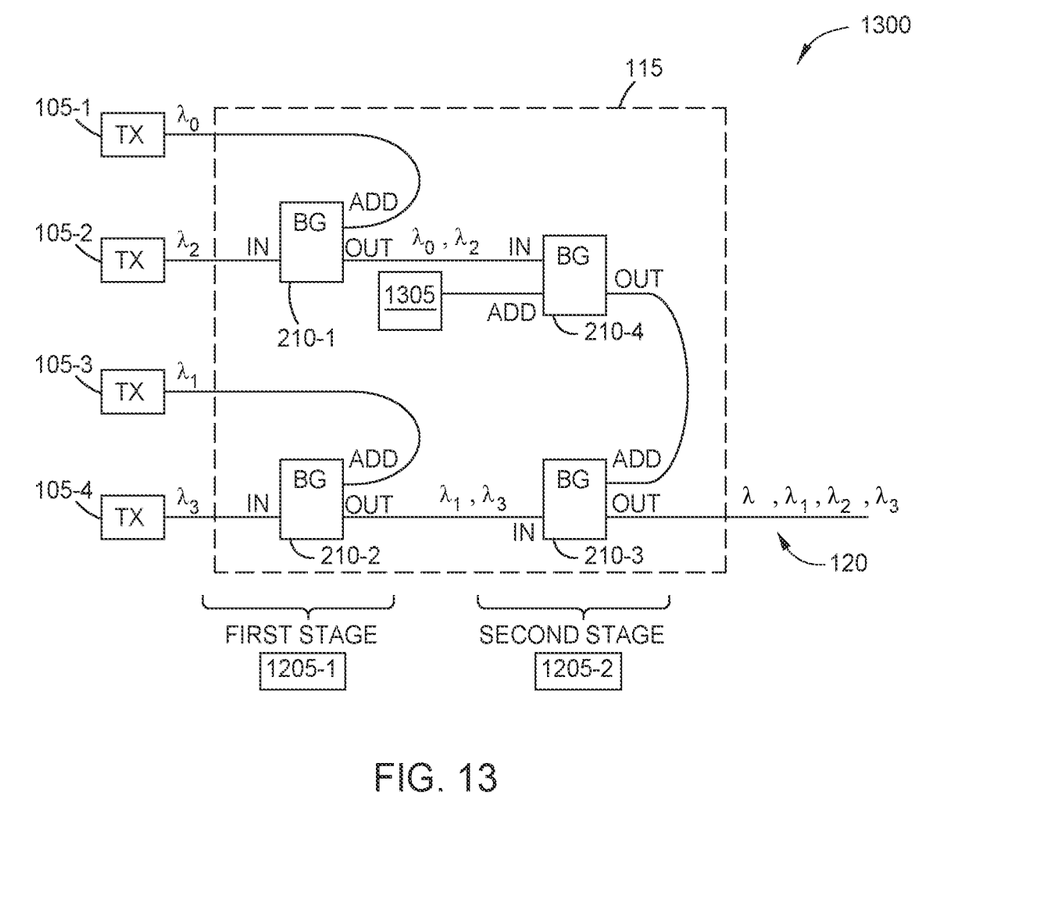

FIG. 13 is a diagram 1300 of an exemplary multiplexer 115 with multiple stage Bragg gratings, according to one or more embodiments. The features of the diagram 1300 may be used in conjunction with other embodiments.

In the diagram 1300, the multiplexer 115 further comprises a fourth Bragg grating 210-4 in the second stage 1205-2, which comprises an input port IN, an add port ADD, and an output port OUT. As shown, the input port IN of the fourth Bragg grating 210-4 is directly coupled with the output port OUT of the second Bragg grating 210-2. The output port OUT of the fourth Bragg grating 210-4 is directly coupled with the add port ADD of the third Bragg grating 210-3.

Beneficially, including the fourth Bragg grating 210-4 helps to mitigate a crosstalk susceptibility of the multiplexer 115. In some embodiments, an optical absorber 1305 is coupled with the add port ADD of the fourth Bragg grating 210-4. Beneficially, the optical absorber 1305 mitigates reflections of optical signals, which can further improve the SNR of the second optical signal output from the output port OUT of the fourth Bragg grating 210-4.

Figure 14:
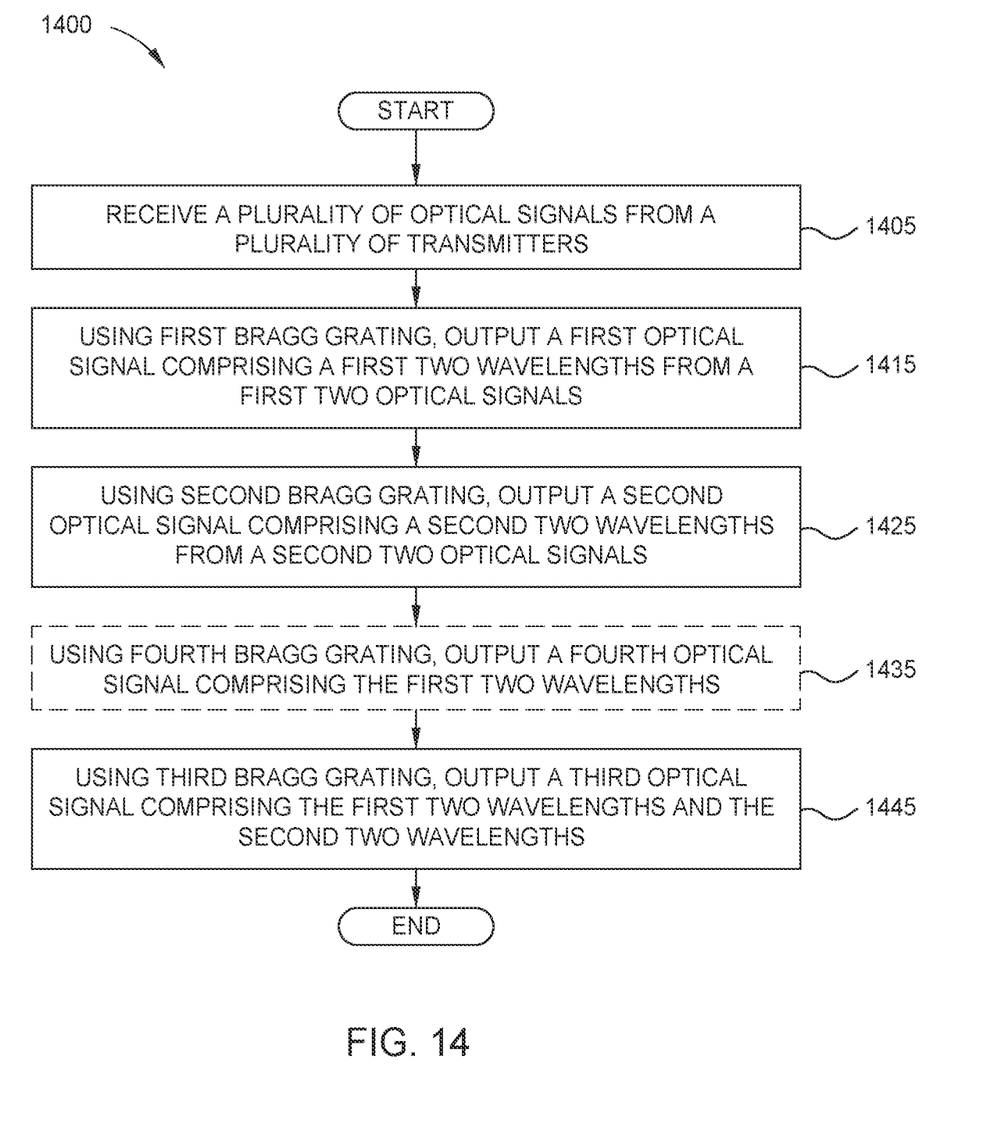
FIG. 14 illustrates a method of multiplexing using a plurality of Bragg gratings, according to one or more embodiments.

FIG. 14 illustrates a method 1400 of multiplexing using a plurality of Bragg gratings, according to one or more embodiments. The method 1400 may be performed in conjunction with other embodiments, e.g., using the multiplexer 115 of FIGS. 1, 12, and 13.

The method 1400 begins at block 1405, where a plurality of optical signals are received from a plurality of transmitters. At block 1415, a first Bragg grating (e.g., the first Bragg grating 210-1 of FIGS. 12, 13) is used to output a first optical signal comprising a first two wavelengths from a first two optical signals of the plurality of optical signals. At block 1425, a second Bragg grating (e.g., the second Bragg grating 210-2 of FIGS. 12, 13) is used to output a second optical signal comprising a second two wavelengths from a second two optical signals of the plurality of optical signals.

At an optional block 1435, a fourth Bragg grating (e.g., the fourth Bragg grating 210-4 of FIG. 13) is used to output a fourth optical signal comprising the first two wavelengths. In some embodiments, the output port of the first Bragg grating is directly coupled to the fourth Bragg grating. At block 1445, a third Bragg grating (e.g., the third Bragg grating 210-3 of FIGS. 12, 13) is used to output a third optical signal comprising the first two wavelengths and the second two wavelengths. The method 1400 ends following completion of block 1445.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure are described with reference to flowchart illustrations and/or block diagrams of methods, apparatus (systems) and computer program products according to embodiments presented in this disclosure.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical apparatus comprising:
 a multiple-stage arrangement of two-mode Bragg gratings comprising:
  at least a first Bragg grating of a first stage, wherein the first Bragg grating is configured to transmit a first mode of each of a first two wavelengths of a received optical signal, and to reflect a second mode of each of a second two wavelengths of the received optical signal, wherein the first mode and the second mode are different from each other;
  a second Bragg grating of a second stage, wherein the second Bragg grating is configured to transmit one of the first two wavelengths and to reflect an other of the first two wavelengths; and a third Bragg grating of the second stage, wherein the third Bragg grating is configured to transmit one of the second two wavelengths and to reflect an other of the second two wavelengths.

2. The optical apparatus of claim 1, wherein the first Bragg grating comprises different sidewall corrugation periods.

3. The optical apparatus of claim 1,
wherein the first two wavelengths correspond to a first two passbands that are non-overlapping, and
wherein the second two wavelengths correspond to a second two passbands that are non-overlapping.

4. The optical apparatus of claim 1, wherein the first stage further comprises:
a fourth Bragg grating configured to receive the second two wavelengths reflected by the first Bragg grating, and to reflect the second two wavelengths to the third Bragg grating.

5. The optical apparatus of claim 1, wherein the first Bragg grating, the second Bragg grating, and the third Bragg grating are formed in a waveguide layer comprising a semiconductor material.

6. An optical apparatus comprising:
a plurality of transmitters; and
a multiplexer having a multiple-stage arrangement of two-mode Bragg gratings comprising:
a first Bragg grating having a first input port coupled with a first transmitter of the plurality of transmitters, a first add port coupled with a second transmitter of the plurality of transmitters, and a first output port configured to output a first optical signal comprising a first two wavelengths, wherein the first Bragg grating is configured to transmit a first mode of one of the first two wavelengths received at the first input port, and to reflect a second mode of an other of the first two wavelengths received at the first add port;
a second Bragg grating having a second input port coupled with a third transmitter of the plurality of transmitters, a second add port coupled with a fourth transmitter of the plurality of transmitters, and a second output port configured to output a second optical signal comprising a second two wavelengths, wherein the second Bragg grating is configured to transmit a first mode of one of the second two wavelengths received at the second input port, and to reflect a second mode of an other of the second two wavelengths received at the second add port; and
a third Bragg grating having a third input port configured to receive the first two wavelengths, a third add port configured to receive the second two wavelengths, and a third output port configured to output a third optical signal comprising the first two wavelengths and the second two wavelengths.

7. The optical apparatus of claim 6,
wherein the third input port is directly coupled with the first output port, and
wherein the third add port is directly coupled with the second output port.

8. The optical apparatus of claim 6, wherein the multiple-stage arrangement of two-mode Bragg gratings further comprises:
a fourth Bragg grating directly coupled with the first output port,
wherein a fourth output port of the fourth Bragg grating is directly coupled with one of the third input port and the third add port.

9. The optical apparatus of claim 6, wherein the third Bragg grating comprises different sidewall corrugation periods.

10. The optical apparatus of claim 6, wherein the multiplexer comprises a coarse wavelength division multiplexing (CWDM) multiplexer.

11. The optical apparatus of claim 10, wherein the first two wavelengths correspond to a first two passbands that are non-overlapping, and
wherein the second two wavelengths correspond to a second two passbands that are non-overlapping.

12. An optical apparatus comprising:
a plurality of receivers; and
a demultiplexer having a multiple-stage arrangement of two-mode Bragg gratings comprising:
a first Bragg grating having a first input port configured to receive an optical signal, a first drop port configured to transmit a first mode of each of a first wavelength and a second wavelength of the optical signal, and a first output port configured to transmit a second mode of each of a third wavelength and a fourth wavelength of the optical signal, wherein the first mode and the second mode are different from each other;
a second Bragg grating having a second input port configured to receive the first wavelength and the second wavelength, a second drop port configured to transmit the first wavelength to a first receiver of the plurality of receivers, and a second output port configured to transmit the second wavelength to a second receiver of the plurality of receivers; and
a third Bragg grating having a third input port coupled with the first output port, a third drop port configured to transmit the third wavelength to a third receiver of the plurality of receivers, and a third output port configured to transmit the fourth wavelength to a fourth receiver of the plurality of receivers.

13. The optical apparatus of claim 12, wherein the multiple-stage arrangement of two-mode Bragg gratings further comprises:
a fourth Bragg grating having a fourth input port directly coupled with the first drop port, and a fourth drop port directly coupled with the second input port.

14. The optical apparatus of claim 13, further comprising:
an optical absorber coupled with a fourth output port of the fourth Bragg grating.

15. The optical apparatus of claim 12, wherein the demultiplexer comprises a coarse wavelength division multiplexing (CWDM) demultiplexer.

16. The optical apparatus of claim 12, wherein the first wavelength and the second wavelength correspond to a first two passbands that are non-overlapping, and
wherein the third wavelength and the fourth wavelength correspond to a second two passbands that are non-overlapping.

17. The optical apparatus of claim 1,
wherein the first mode comprises a fundamental mode of each of the first two wavelengths, and
wherein the second mode comprises one of a first-order mode or a second-order mode of the second two wavelengths.

18. The optical apparatus of claim 17, wherein the multiple-stage arrangement further comprises:
a first mode multiplexer configured to convert the first-order mode or the second-order mode of the second two wavelengths into a fundamental mode of each of the second two wavelengths.

19. The optical apparatus of claim 18, wherein the second Bragg grating is configured to:
   transmit the fundamental mode of the one of the first two wavelengths; and
   reflect one of a first-order mode or a second-order mode of the other of the first two wavelengths.

20. The optical apparatus of claim 19, wherein the multiple-stage arrangement further comprises:
   a second mode multiplexer configured to convert the first-order mode or the second-order mode of the other of the first two wavelengths into a fundamental mode of the other of the first two wavelengths.

\* \* \* \* \*

UNITED STATES PATENT AND TRADEMARK OFFICE
CERTIFICATE OF CORRECTION

PATENT NO. : 11,249,246 B2
APPLICATION NO. : 17/107298
DATED : February 15, 2022
INVENTOR(S) : Tao Ling et al.

It is certified that error appears in the above-identified patent and that said Letters Patent is hereby corrected as shown below:

On the Title Page

Item (74), in Column 2, in "Attorney, Agent, or Firm", Line 1, delete "Sherdan," and insert -- Sheridan, --.

In the Specification

In Column 6, Line 56, delete "Ai," and insert -- $\lambda 1$, --.

In Column 7, Line 21, delete "$\lambda 2$" and insert -- $\Lambda 2$ --.

Signed and Sealed this
Seventeenth Day of May, 2022

Katherine Kelly Vidal
*Director of the United States Patent and Trademark Office*